(12) United States Patent
Tomaru (10) Patent No.: US 7,295,355 B2
(45) Date of Patent: Nov. 13, 2007

(54) IMAGE READING APPARATUS

(75) Inventor: Takashi Tomaru, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 830 days.

(21) Appl. No.: 10/146,925

(22) Filed: May 17, 2002

(65) Prior Publication Data

US 2003/0214687 A1    Nov. 20, 2003

(51) Int. Cl.
*H04N 1/46*    (2006.01)
(52) U.S. Cl. ........................ 358/505; 358/514; 358/515
(58) Field of Classification Search ................ 358/505, 358/514, 515
See application file for complete search history.

(56) References Cited

U.S. PATENT DOCUMENTS 5,481,381 A * 1/1996 Fujimoto .................... 358/505
5,859,712 A * 1/1999 Kim ........................... 358/504
5,953,014 A * 9/1999 Wood ......................... 345/422

FOREIGN PATENT DOCUMENTS

| JP | A-03-068256 | 3/1991 |
| JP | A 3-68256 | 3/1991 |
| JP | A 11-27452 | 1/1999 |
| JP | A 2000-113162 | 4/2000 |
| JP | A 2000-113163 | 4/2000 |
| JP | A 2000-270157 | 9/2000 |

* cited by examiner

*Primary Examiner*—Jerome Grant
*Assistant Examiner*—Houshang Safaipour
(74) *Attorney, Agent, or Firm*—Oliff & Berridge, PLC (57) ABSTRACT

An image reading apparatus includes an image reading device having a plurality of solid-state image sensing device arrays arranged to be parallel to each other, the image reading device for optically reading an image on an original and a registration adjusting device for performing a position variable process operation to correct a gap of a position to be read on the original, which corresponds to intervals between the solid-state image sensing device arrays.

18 Claims, 5 Drawing Sheets

WHEN READING COLOR IMAGE

FIG.5(b)

WHEN READING BLACK AND WHITE IMAGE

FIG.6(a)

WHEN READING COLOR IMAGE

FIG.6(b)

WHEN READING BLACK AND WHITE IMAGE

IMAGE READING APPARATUS

The present disclosure relates to a subject matter contained in Japanese Patent Application No.2001-114986 filed on Apr. 13, 2001, which is incorporated herein by reference in its entirety.

BACKGROUND OF THE INVENTION

1. Field of the Invention

The present invention is related to an image reading apparatus for optically reading an image illustrated on an original to be read out from this original, for example, a copying machine and a scanner apparatus.

2. Description of the Related Art

In general, various sorts of image reading apparatus capable of reading color images as well as black/white (monochrome) images have been widely available. Generally speaking, while such a image reading apparatus owns a three-line structure of solid-state image sensing device arrays corresponding to respective color components of R(red), G(green), B(blue) colors in order to read out a color image, when a black/white image is read out, the image reading apparatus produces black/white image data based upon any one of these three R,G,B color component signals. Otherwise, this image reading apparatus acquires a luminance signal "L" by performing the CIE Lab conversion and the like as to the respective R,G,B color component signals so as to produce black/white image data.

However, while the above-described image reading apparatus owns such a merit that the black/white image data can be obtained without requiring the solid-state image sensing device array which is exclusively used to image such a black/white image, this image reading apparatus has such a difficulty. That is, in order to acquire this black/white image data, the respective R,G,B color component signals should be read. Moreover, a predetermined image processing operation (Lab conversion etc.) is required. The high-speed image reading operation can be hardly realized. In particular, while black/white images are read by such image reading apparatus, high-speed reading characteristics thereof are required, as compared with reading operation of color information which requires high gradation characteristics.

Under such a circumstance, very recently, several image reading apparatus have been proposed, which own both the high gradation characteristics realized when color information is read out, and the high-speed characteristics realized when black/white images are read out. For instance, in such an image reading apparatus disclosed in JP-A-Hei. 11-27452, since one line of a solid-state image sensing device array is provided in order to exclusively image a black/white image in addition to a three-line structure of solid-state image sensing device arrays corresponding to the respective R,G,B color components, both the high gradation characteristic and the high-speed characteristic can be realized. Also, as to the solid-state image sensing device array dedicated to the black/white imaging operation, more high-speed operations have been proposed by increasing a total number of transfer registers which are coupled to this solid-state image sensing device array (for instance, normally, while 4 pieces of transfer registers per 1 line are employed instead of 2 pieces thereof, 4-divisional transfer operation is available only for black/white imaging line).

However, in the case that a solid-state image sensing device array exclusively used to image a black/white (monochrome) image is provided, a shift (gap) will be produced at a position to be read on an original, while this shift, or gap corresponds to an interval between this solid-state image sensing device array for imaging the black/white image and solid-state image sensing device arrays for reading a color image. In particular, such a case that transfer registers used for the solid-state image sensing device array exclusively used to image the black/white image is increased, since the interval between the solid-state image sensing device array exclusively used to image the black/white image and the solid-state image sensing device arrays used to image the color image is widened by the space for these increased transfer registers. As a result, the gap of the position to be read on the original is also increased.

Such a gap on the position to be read on the original may introduce a difference in original reading areas between the solid-state image sensing device array exclusively used to image the black/white image, and the solid-state image sensing device arrays used to image the color image. As a consequence, when this gap is increased, there is a risk that a slight cut may be produced in a tip portion of an image read out from an original. Also, there is another risk that noise components produced by reading any positions other than an original (otherwise, platen glass) are superimposed on a reading result of an image.

To avoid this risk, for instance, while a FIFO (First-In First-Out) memory is employed, output timing of image read out results may be delayed in the unit of a line. In an actual case, as to three lines in solid-state image sensing device arrays for imaging a color image, normally, the respective lines are arranged in proximately to each other. As a result, this risk may be solved by performing the line delay process operation with employment of such a FIFO memory. However, since the interval between the solid-state image sensing device array for exclusively imaging the black/white image and the solid-state image sensing device arrays for imaging the color image is made wide, if such a risk is avoided by executing the line delay process operation similar to that of the three lines for the color image, then a very large storage capacity of memories are necessarily required. As a result, there is a certain possibility that the resultant image reading apparatus is manufactured in high cost. Moreover, since the line delay process operation cannot remove the gap itself, this line delay process operation cannot solve the above-explained deterioration in the reading image qualities occurred in the vicinity of the edge portion of the original, which is caused by the large gap.

As a consequence, the present invention has an object to provide an image reading apparatus operable in such a manner that even when a plurality of solid-state image sensing device arrays are arranged to be parallel to each other, a gap of a position to be read on an original, which corresponds to the parallel arrangement of these solid-state image sensing device arrays, can be corrected, so that a deterioration of reading image qualities can be avoided.

SUMMARY OF THE INVENTION

To achieve the above-described object, there is provided an image reading apparatus has an image reading device having a plurality of solid-state image sensing device arrays arranged to be parallel to each other, the image reading device for optically reading an image on an original and a registration adjusting device for performing a position variable process operation to correct a gap of a position to be read on the original, which corresponds to intervals between the solid-state image sensing device arrays.

In accordance with the image reading apparatus with employment of the above-described arrangement, even when the gap is produced at the position to be read on the original, which corresponds to the interval between the plural solid-state image sensing device arrays arranged side by side, the registration adjusting device can correct this gap by executing the position variable process operation. In this case, the position variable process operation does not imply that the signal process operation is carried out with respect to the result of reading the image by the solid-state image sensing device arrays, but implies that, for instance, a relative position between an optical axis position of reflection light obtained from an original and the respective solid-state image sensing device arrays is mechanically and variably changed or implies that a scanning start position from which an optical reading/scanning system starts to scan is variably changed. As a consequence, since the gap of the position to be read can be corrected by executing such a position variable process operation, there is no risk that deterioration occurs in the reading image qualities, which is caused by this gap.

BRIEF DESCRIPTION OF THE DRAWINGS

Exemplary embodiments will be described with reference to drawings in which like reference numerals represent like parts, and wherein:

FIG. 3 is an explanatory diagram (No. 1) for explaining a conceptional idea of a first embodiment of a gap correction realized by a position variable process operation performed by the image reading apparatus according to the present invention.

FIG. 4 is an explanatory diagram (No. 2) for explaining a conceptional idea of the first embodiment of a gap correction realized by a position variable process operation performed by the image reading apparatus according to the present invention.

FIG. 5 is an explanatory diagram for explaining a conceptional idea of a second embodiment of a gap correction realized by a position variable process operation performed by the image reading apparatus according to the present invention.

FIG. 6 is an explanatory diagram for explaining a conceptional idea of a third embodiment of a gap correction realized by a position variable process operation performed by the image reading apparatus according to the present invention.

FIG. 7 is an explanatory diagram for explaining a conceptional idea of a fourth embodiment of a gap correction realized by a position variable process operation performed by the image reading apparatus according to the present invention.

FIG. 8 is an explanatory diagram for explaining a concrete example of a pulse control of a fourth embodiment of a gap correction realized by a position variable process operation performed by the image reading apparatus according to the present invention.

FIG. 10 is an explanatory diagram for explaining a concrete example of a pulse control conceptional idea of a sixth embodiment of a gap correction realized by a position variable process operation performed by the image reading apparatus according to the present invention.

DETAILED DESCRIPTION OF THE EMBODIMENTS

An image reading apparatus according to the present inventing will now be described with reference to the drawings.

[Explanation of Outline Structure of Image Reading Apparatus]

Figure 1:
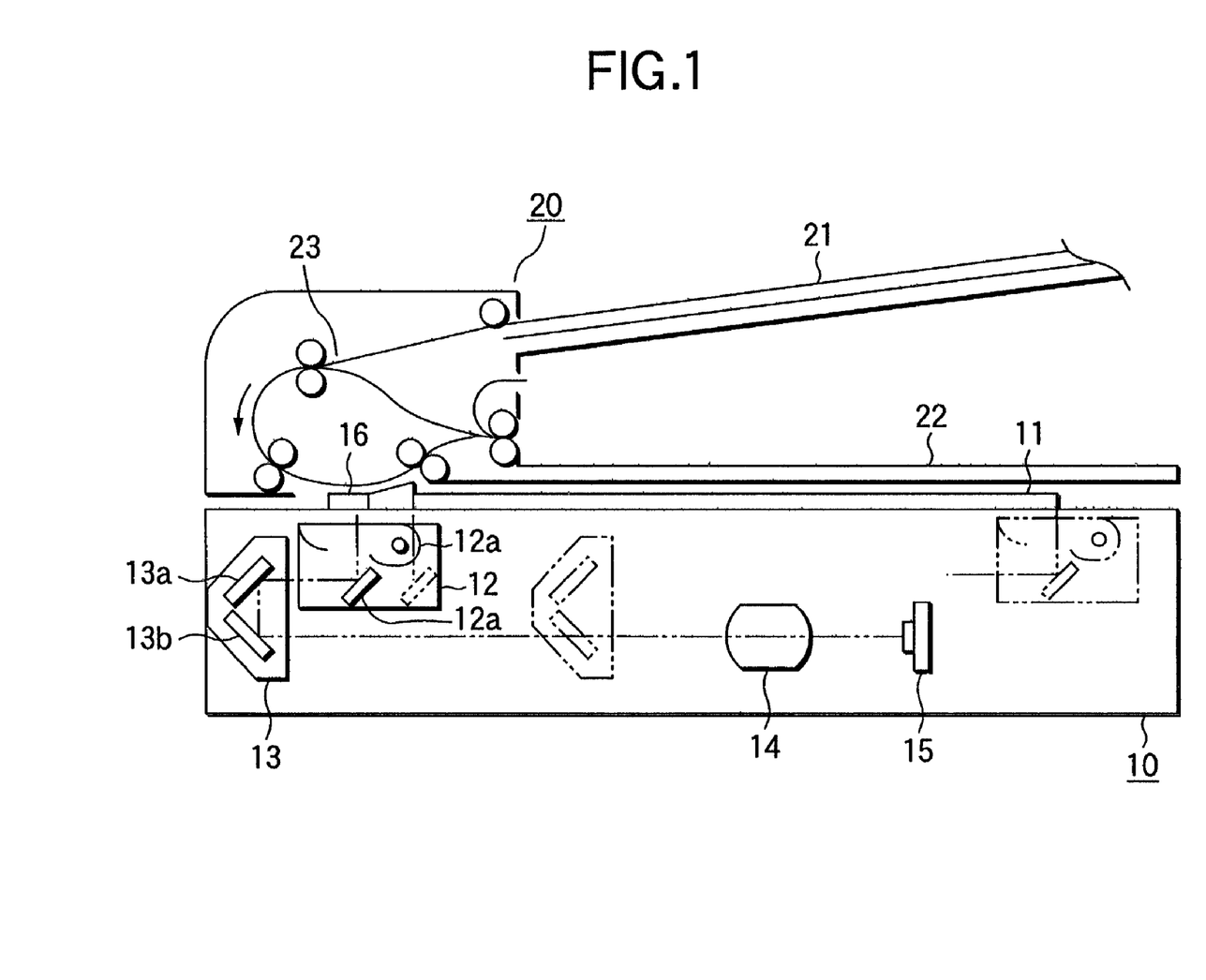
FIG. 1 is a side-sectional view for showing an example of a conceptional structure of an image reading apparatus according to the present invention.
Figure 2:
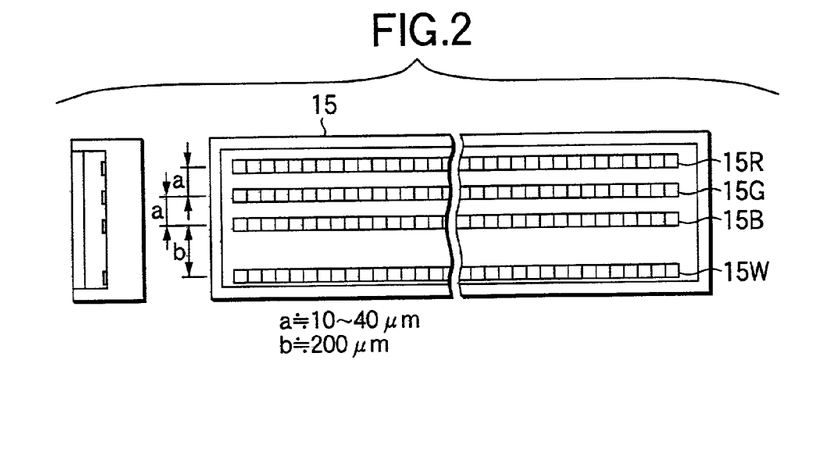
FIG. 2 is a schematic diagram for indicating a structural example of solid-state image sensing device arrays employed in the image reading apparatus according to the present invention.

First, a description is made of a conceptional structure of the image reading apparatus. FIG. 1 is a side-sectional view for indicating one example of the conceptional structure of the image reading apparatus according to the present invention. FIG. 2 is a schematic diagram for showing a structural example of a solid-state image sensing device array employed in this image reading apparatus.

It should be understood that the image reading apparatus explained in this specification is such an apparatus capable of optically reading an image illustrated on a sheet-shaped original. This image reading apparatus may be applied to both systems, namely, a so-called "platen scan system" in which an image is read out from an original mounted on platen glass, and a so-called "CVT (Constant Velocity Transfer)" system in which while an original to be read is moved, an image is read out from the original. To this end, the image reading apparatus is equipped with a scanner unit 10 and a CVT original feeding unit 20, as shown in FIG. 1. It should also be noted that an original spread system is involved in this platen scan system, while an original is spread on platen glass by an original transporting apparatus and stopped, thereafter an image of the stopped original is read in this original spread system.

The scanner unit 10 contains platen glass 11, a full rate carriage (will be abbreviated as an "F/R-CRG" hereinafter) 12, and a half rate carriage (will be abbreviated as an "H/R-CRG" hereinafter) 13. An original is mounted on the platen glass 11 during image reading operation in the platen scan system. The F/R-CRG 12 scans a reading plane of the original which is mounted on this platen glass 11. The H/R-CRG 13 is moved over a half area at a half velocity of the velocity of the F/R-CRG 12. Both a lamp 12a for illuminating the original mounted on the platen glass 11 and a first mirror 12b for reflecting thereon an optical image from this original are mounted on the F/R-CRG 12. Also, both a second mirror 13a and a third mirror 13b are mounted on the H/R-CRG 13, while both the second and third mirrors 13a and 13b may conduct the optical image reflected from the first mirror 12b.

Any of these F/R-CRG 12 and H/R-CRG 13 is driven by a carriage drive motor constructed of a pulse motor, or the like (not shown). Then, the driving operation by this carriage drive motor is managed by a pulse control executed in a motor drive circuit (not shown). It should also be noted that there are differences in transport velocities and transport areas as to the F/R-CRG 12 and the H/R-CRG 13. These differences are required in order that optical path lengths among solid-state image sensing device arrays (will be explained later) and these F/R-CRG 12 and H/R-CRG 13 are continuously kept constant.

In addition to the platen glass 11, the F/R-CRG 12 and the H/R-CRG 13, a lens 14 is provided with the scanner unit 10. This lens 14 collects reflection light which is derived form the original via these F/R-CRG 12 and H/R-CRG 13, and then, focuses this reflection light onto a solid-state image sensing device array group 15 constituted by a CCD sensor, and the like.

Then, in the case that an original is mounted on the platen glass 11, both the F/R-CRG 12 and the H/R-CRG 13 are transported along this platen glass 11 at a constant velocity by being driven by the carriage drive motor so as to scan the original mounted on this platen glass 11. As a result of this scanning operation, the solid-state image sensing device array group 15 reads out image data from the original mounted on the platen glass 11 via this platen glass 11, the respective first to third mirrors 12a, 13a, 13b, and the lens 14, which are mounted on the F/R-CRG 12 and the H/R-CRG 13. In other words, the image reading operation corresponding to the platen scan system is carried out in the image reading apparatus.

On the other hand, in order to read out a plurality of originals in a continuous manner, for instance, a CVT original feeding unit 20 and the like are installed above the scanner unit 10 having such a structure. The CVT original feeding unit 20 is arranged by a so-called "automatic document feeder (ADF)", and is provided with a paper supply tray 21, a paper eject tray 22, and an original transporting device 23. In the paper supply tray 21, plural originals to be read are stacked. In the paper eject tray 22, originals which have been read are ejected. The original transporting device 23 sequentially feeds out the originals set in the paper supply tray 21, and then, ejects these originals into the paper eject tray 22. Alternatively, the original transporting device 23 may be provided with an original reversing mechanism used to read images from both planes of an original.

On the other hand, in such a CVT original feeding unit 20, a CVT original reading position is provided at a preselected portion on an original transport path defined from the paper supply tray 21 up to the paper eject tray 22. In correspondence with this CVT original reading position, CVT-designed platen glass 16 is arranged in the scanner unit 10 irrespective of the platen glass 11. Furthermore, the F/R-CRG 12 may be located at a predetermined position (will be referred to as a "home position" hereinafter) below this CVT-designed platen glass 16.

Then, in the CVT original feed unit 20, such an original which is intended to be read out is transported in such a manner that this original to be read passes through the CVT original reading position in a constant velocity under such a condition that both the F/R-CRG 12 and the H/R-CRG 13 of the scanner unit 10 remain stationary at the home position corresponding to the CVT original reading position. As a result, the image reading operation is carried out in accordance with the CVT system in the image reading apparatus.

As previously explained, the image reading apparatus can be selectively operated in accordance with both the image reading operation by the platen scan system and the image reading operation by the CVT system. In any of these systems, the image reading operation thereof is carried out using the solid-state image sensing device array group 15.

As shown in FIG. 2, the solid-state image sensing device array group 15 includes a plurality of solid-state image sensing device arrays in which light receiving cells (pixels) such as photodiodes are arrayed in a straight line form. Concretely speaking, the solid-state image sensing device group 15 contains a three-line structure of element arrays 15R, 15G, 15B, which correspond to spectral sensitivity (responsivity) characteristics of the respective colors R, G, B, and also contains another element array 15W which corresponds to a spectral sensitivity characteristic of B/W (black/white, monochrome).

The three-line structure of element arrays 15R, 15G, 15B is used to read a color image from an original which is an object to be read. These element arrays 15R, 15G, and 15B are sequentially arranged side by side with a predetermined interval (for instance, interval of 10 to 40 µm), which is similar to general-purpose solid-state image sensing devices for color images. On the other hand, the element array 15W is arranged so as to exclusively read a monochrome image. This element array 15W is arranged side by side with respect to the element array 15B. The element array 15W is offset along an original transport direction (sub-scanning direction) with respect to the respective element arrays 15R, 15G, 15B so that the element array 15W has an interval (200 µm) with respect to the closest element array (the element array 15B) of the three line structure of the element arrays 15R, 15G, 15B, the interval larger than the predetermined interval among the element arrays 15R, 15G, 15B. As a result, while using the large intervals among the respective element arrays 15R, 15G, 15B, the element array 15W can realize, for example, 4 divisional transfer operation by 4 sets of transfer registers, namely, can realize high-speed signal reading operations.

The respective element arrays 15R, 15G, 15B, and 15W in the solid-state image sensing device array group 15 having such a structure are driven by timing signals based on predetermined clock signals supplied from a drive circuit (not shown).

On the other hand, the element arrays 15R, 15G, 15B and 15W employed in the solid-state image sensing device array group 15 are arranged side by side along such a plane (vertical direction viewed in FIG. 1) which is substantially perpendicular to an optical axis direction (horizontal direction viewed in FIG. 1) transmitted through the lens 14. As a consequence, for instance, assuming now that the element array 15G is used as a reference, which is located at the center position among the three-line structure of element arrays 15R, 15G, 15B, as previously explained, a certain interval (for example, 240 um) is present between this element array 15G and the element array 15W. As a consequence, a gap of a position to be read on an original will be produced in correspondence with existence of this interval.

To the contrary, in the image reading apparatus according to the present invention, this gap may be corrected by executing a position variable process operation. Now, a detailed description will be made of this position variable process operation for correcting the gap.

[Description of First Embodiment]

First, a gap correction realized by a positional variable process operation, according to a first embodiment, will now be explained. FIG. 3 and FIG. 4 are explanatory diagrams for indicating a conceptional idea of the gap correction according to the first embodiment.

Figure 3A:
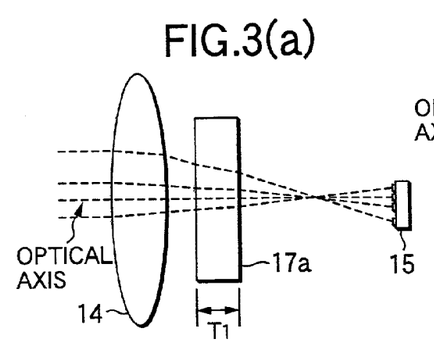
FIG. 3(a) is a diagram for indicating a condition when a color image is read.
Figure 3B:
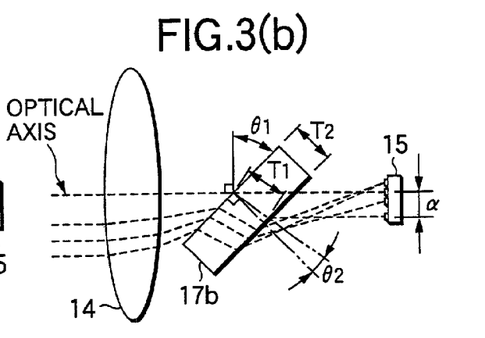
FIG. 3(b) is a diagram for representing a condition when a black/white image is read.
Figures 4A, 4B:
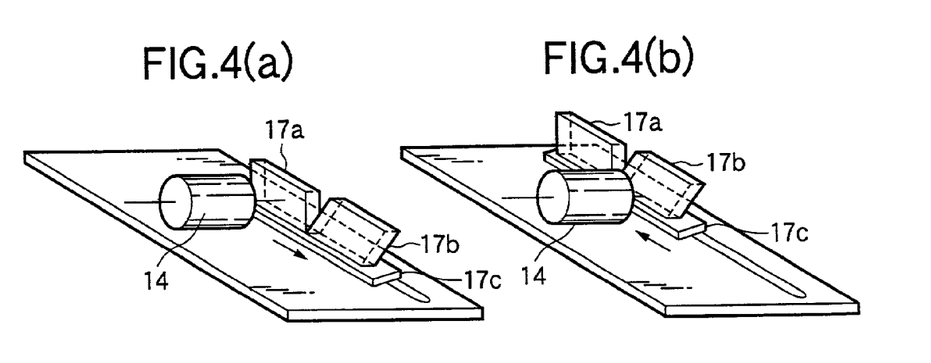
FIG. 4(a) is a diagram for indicating a condition when a color image is read.
FIG. 4(b) is a diagram for representing a condition when a black/white image is read.

In the image reading apparatus according to this embodiment, either a transmission glass 17a shown in FIG. 3(a) or another transmission glass 17b indicated in FIG. 3(b) is interposed between the lens 14 and the solid-state image sensing device array group 15. The transmission glass 17a is made of such a glass member having a flat plate shape on which reflection light reflected from an original is incident at a substantially right angle. On the other hand, the transmission glass 17b is made of such a glass member having a flat plate shape on which the reflection light reflected from the original is incident not at the substantially right angle, but at a predetermined angle. Then, the reflection light reflected from the original is selectively transmitted through any one of the transmission glass 17a and the transmission glass 17b.

At this time, for instance, it is assumed that the solid-state image sensing device array group 15 and the like are arranged in such a manner that a focusing position of reflection light which passes through a near center (if reflection light passes through center, then this center is optical axis) portion of the lens 14 is made coincident with the position of the element array 15G which is located at the center position of the three-line structure of the element arrays. When the reflection light passes through the transmission glass 17a, such a reflection light which passes through the near center portion of the lens 14 is directly incident on the element array 15G, as shown in FIG. 3(a). To the contrary, as represented in FIG. 3(b), when the reflection light passes through the transmission glass 17b, propagation path of this reflection light is changed due to the refraction effect of light caused by an inclination of the glass. As a result, the reflection light which passes through the near center portion of the lens 14 is not incident on the element array 15G. In other words, this reflection light may be incident on the element array 15W which has a certain interval (for instance, 240 μm) with respect to the above-described element array 15G.

In order to realize this propagation path change, both plate thicknesses "$T_1$" and "$T_2$" of the transmission glass 17a and 17b, and also, an inclination angle "$\theta_1$" of the transmission glass 17b may be set in such a manner that conditions as to the below-mentioned formulae (1) to (3) can be satisfied:

$$\sin\theta_1 = n \times \sin\theta_2 \text{ (Snell's law)} \quad (1)$$

$$T_2 = T_1 \cos\theta_2 \quad (2)$$

$$T_1 \sin(\theta_1 - \theta_2) = \alpha \quad (3)$$

It is so assumed that in the above-explained formulae (1) to (3), symbol "n" shows a refractive index of glass (for instance, 1.5), symbol "α" indicates a distance between element arrays, symbol "$\theta_1$" represents an inclination angle, and is in a range of $0° < \theta_1 < 90°$. As a consequence, for example, assuming now that α=0.24 mm (240 μm) and $\theta_1$=15°, the plate thicknesses "$T_1$" is nearly equal to 2.72 mm and "$T_2$" is nearly equal to 2.68 mm.

The reason why the plate thickness "$T_1$" of the transmission glass 17a is different from the plate thickness "$T_2$" of the transmission glass 17b is given as follows. That is, even when the reflection light passes through any of these transmission glasses 17a and 17b, the optical path lengths between the original and the solid-state image sensing device array group 15 are made substantially equal to each other. In other words, in order that the focusing position (pint position) of the reflection light is located on the solid-state image sensing device array group 15, the length of the optical path transmitting the transmission glass 17b is made equal to the plate thickness "$T_1$" of the transmission glass 17a (see the above-explained formula (2)).

The selection for selectively determining as to whether the reflection light passes through the transmission glass 17a, or the transmission glass 17b may be switched by moving the positions of these transmission glasses 17a and 17b. For example, as indicated in FIG. 2, while a base plate 17c which mounts both the transmission glass 17a and the transmission glass 17b is interposed between the lens 14 and the solid-state image sensing device array group 15, this base plate 17c is slid by way of a drive source such as a motor (not shown) or an electromagnetic solenoid (not shown either) along a direction perpendicular to the optical axis direction of this lens 14, so that the transmission glass 17a and 17b through which the reflection light passes may be switched.

As a result, in accordance with the image reading apparatus of this first embodiment, since the optical axis position of the reflection light reflected from the original can be varied. Therefore, for instance, it is possible that when a color image is read out, an optical axis position of reflection light reflected from this color image may be made coincident with the element color 15G which is located at the center position of the three-line structure and that when a black/while (monochrome) image is read out, an optical axis position of reflection light reflected from this black/white image is made coincident with the element array 15W. In other words, even when there is a certain interval between the element array 15G and the element array 15W, the optical axis position of the lens 4 is mechanically varied at the focusing position, so that the gap at the position to be read on the original, corresponding to this interval, can be corrected.

As a consequence, in accordance with the image reading apparatus according to this embodiment, even where a certain interval is present between the element arrays 15R, 15G, 15B for reading the color image. The element color 15W for reading the black/white image, there is no such a problem that when the black/white image is read, a slight cut is produced at a tip portion of the image read from the original, and/or a noise component caused by reading a position other than the original is superimposed. In other words, the image quality of the read original is not deteriorated due to the gap of the position to be read on the original.

[Explanation of Second Embodiment]

Next, a description will now be made of a gap correction realized by a position variable process operation, according to a second embodiment. FIG. 5 is an explanatory diagram for indicating a conceptional idea of the gap correction according to the second embodiment.

Figure 5A:
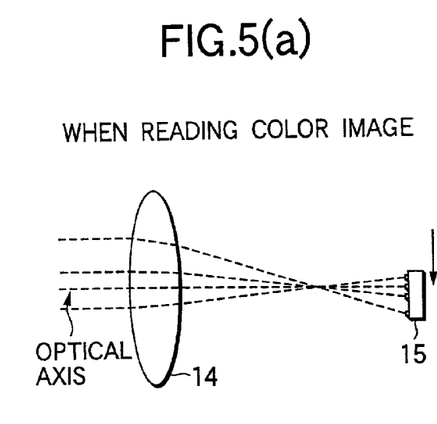
FIG. 5(a) is a diagram for indicating a condition when a color image is read.
Figure 5B:
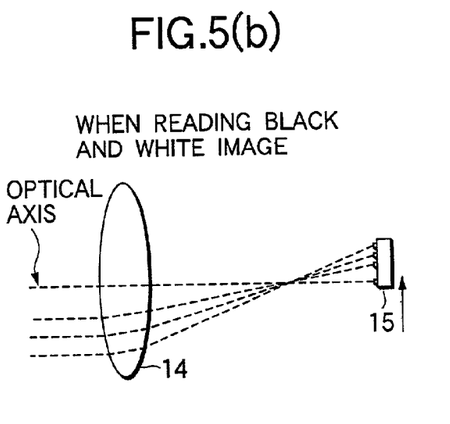
FIG. 5(b) is a diagram for representing a condition when a black/white image is read.

In an image reading apparatus of this second embodiment, as indicated in FIG. 5(a) and FIG. 5(b), the solid-state image sensing device array group 15 may be moved along a direction (namely, substantially vertical direction as viewed in drawings) perpendicular to an optical axis direction (namely, substantially horizontal direction as viewed in drawings) of the lens 14. In other words, the entire portion of the solid-state image sensing device group 15 is moved along the parallel-arranging direction of the respective element arrays 15R, 15G, 15B, and 15G. This movement may be realized by a drive source such as a motor, or an electromagnetic solenoid (not shown).

To the contrary, an optical axis position of reflection light reflected from an original, which is incident on the solid-state image sensing device group 15, cannot be varied, which is different from the case of the first embodiment. It should be noted that since the entire portion of the solid-state image sensing device group 15 is moved, relative positions between the optical axis of the lens 14 and the respective element arrays 15R, 15G, 15B, 15W used in the solid-state image sensing device array group 15 can be varied.

As a consequence, in the image reading apparatus of this second embodiment, since the solid-state image sensing device group 15 is moved, for example, when a color image is read out, as shown in FIG. 5(a), the solid-state image sensing device group 15 is lowered so that the optical axis position of the lens 14 can be made in coincident with the element array 15G which is located at the center position of the three-line structure, whereas when a black/white image is read out, as indicated in FIG. 5(b), the solid-state image sensing device group 15 is lifted up, so that the optical axis position of the lens 14 can be made in coincident with the element array 15W. In other words, even when a certain interval is present between the element array 15G and the element array 15W, the solid-state element array group 15 is mechanically moved so as to variably change the relative position among the optical axis of the lens 14 and the respective element arrays 15R, 15G, 15B, 15W. As a result, the gap of the position to be read on the original, which corresponds to this interval, can be corrected.

As a consequence, similar to the above-described first embodiment, even in the image reading apparatus of this second embodiment, it is possible to avoid deteriorations of reading image qualities, which are caused by the gap of the position to be read on the original.

[Explanation of Third Embodiment]

Next, a description will now be made of a gap correction realized by a position variable process operation, according to a third embodiment. FIG. 6 is an explanatory diagram for indicating a conceptional idea of the gap correction according to the third embodiment.

Figure 6A:
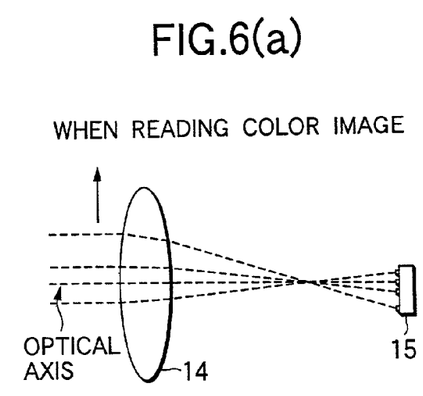
FIG. 6(a) is a diagram for indicating a condition when a color image is read.
Figure 6B:
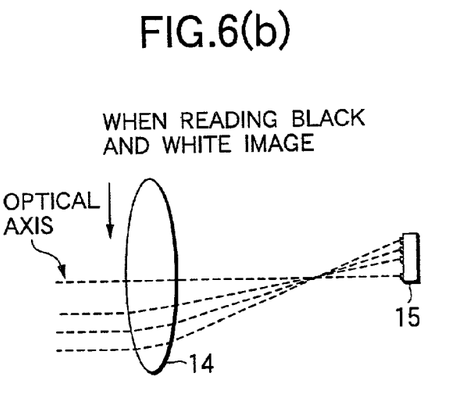
FIG. 6(b) is a diagram for representing a condition when a black/white image is read.

In an image reading apparatus of this third embodiment, as indicated in FIG. 6(a) and FIG. 6(b), the lens 14 may be moved along a direction (namely, substantially vertical direction as viewed in drawings) perpendicular to an optical axis direction (namely, substantially horizontal direction as viewed in drawings) of the lens 14. In other words, contrary to the above-described case of the second embodiment, since the lens 14 is moved, a relative position between the optical axis and the respective element arrays 15R, 15G, 15B, and 15W can be varied. This transport may be realized by a drive source such as a motor, or an electromagnetic solenoid (not shown).

As a consequence, in the image reading apparatus of this third embodiment, since the lens 14 is moved, for example, when a color image is read out, as shown in FIG. 6(a), the lens 4 is lifted up so that the optical axis position of the lens 14 can be made in coincident with the element array 15G which is located at the center position of the three-line structure, whereas when a black/white image is read out, as indicated in FIG. 6(b) the lens 14 is lowered, so that the optical axis position of the lens 14 can be made in coincident with the element array 15W. In other words, even when a certain interval is present between the element array 15G and the element array 15W, the lens 14 is mechanically moved so as to variably change the relative position among the optical axis of the lens 14 and the element arrays 15R, 15G, 15B, 15W. As a result, the gap of the position to be read on the original, which corresponds to this interval, can be corrected, which is completely similar to the above-described case of the second embodiment. As a consequence, it is possible to avoid deteriorations of reading image qualities, which are caused by the gap of the position to be read on the original.

[Explanation of Fourth Embodiment]

Next, a description will now be made of a gap correction realized by a position variable process operation, according to a fourth embodiment. FIG. 7 and FIG. 8 are explanatory diagrams for indicating a conceptional idea of the gap correction according to the fourth embodiment.

An image reading apparatus according to this fourth embodiment may be applied to such a case that an image reading operation is carried out in the platen scan system. When the image reading operation corresponding to the platen scan system is carried out, an original to be read is mounted on the platen glass 11 of the scanner unit 10.

At this time, as indicated in FIG. 7, positioning of the original is determined by one edge of an original abutting guide 18 provided on the platen glass 11. That is to say, the original is mounted on the platen glass 11, while a so-called "registration position" is employed as a reference, and this registration position is specified by one edge portion of the original abutting guide 18. As a result, while the registration position is used as a scanning start position, the F/R-CRG 12 which scans the original mounted on the platen glass 11 accomplishes an acceleration from a stational state up to this registration position, and then, is moved in a constant velocity from the registration position.

Figures 7A, 7B:
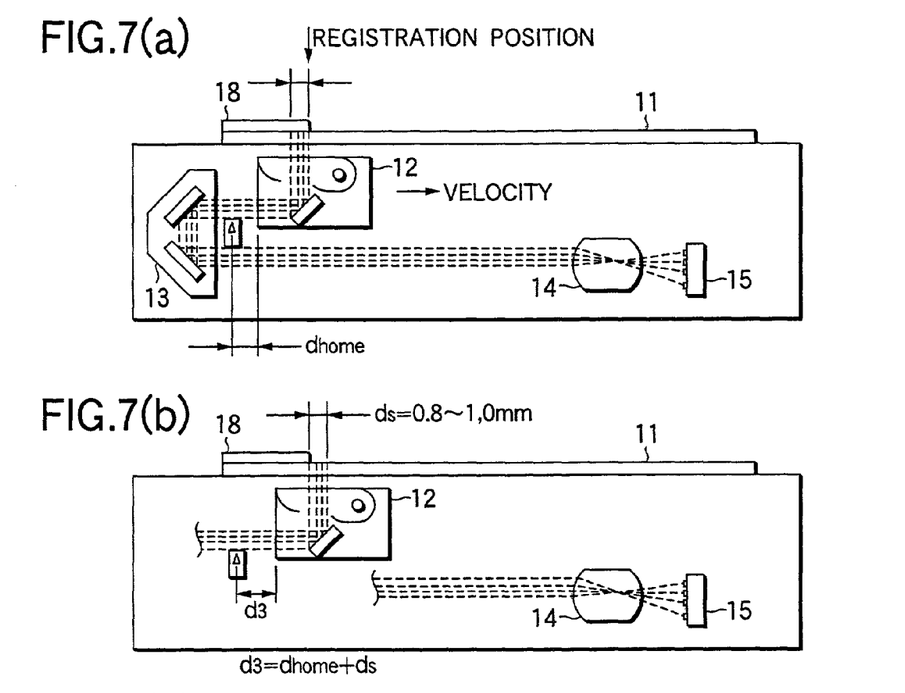
FIG. 7(a) is a diagram for indicating a condition when a color image is read.
FIG. 7(b) is a diagram for representing a condition when a black/white image is read.

However, since a certain interval is present between the element arrays 15R, 15G, 15B used to read out a color image and the element array 15W used to read out a black/white (monochrome) image, for instance, as shown in FIG. 7(a), if a reading position corresponding to the element array 15R located at the farthest position from the element array 15W is made coincident with the registration position, then a reading position corresponding to the element array 15W is shifted by the gap of the position to be read on an original.

As a consequence, in the image reading apparatus of this fourth embodiment, the motor drive circuit for managing the carriage drive motor performs pulse control operation so that the scanning start position of the F/R-CRG12 may be variably changed by a distance equivalent to such a gap which to corrected in response to which one of the element arrays 15R, 15G, 15B, 15W of the solid-state image sensing device array group 15 is used to perform an image reading operation, concretely speaking, in response to which the three line structure of the element arrays 15R, 15G, 15B or the element array 15W exclusively used to read black and white image is used to perform the image reading operation.

For example, in the case that a color image is read out using the element arrays 15R, 15G, 15B, as shown in FIG. 7(a), such a position which is moved by a distance "$d_{home}$" from the stationary position (home position) of the F/R-CRG 12 is set as the scanning start position. At this time, the registration position is made coincident with, for example, the reading position corresponding to the element array 15R.

Figures 8A, 8B, 8C:
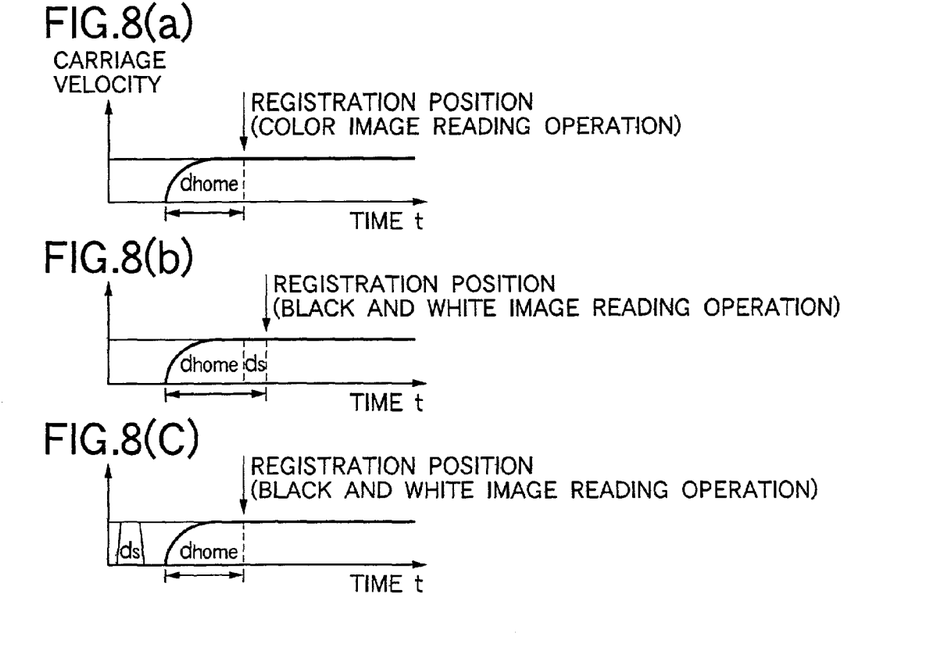
FIG. 8(a) is a diagram for indicating a condition when a color image is read.
FIG. 8(b) and FIG. 8(c) are diagram for representing a condition when a black/white image is read.

Also, the motor drive circuit performs such a pulse control operation as shown in FIG. 8(a) in order to accomplish the acceleration of the F/R-CRG 12 up to the scanning start position. In other words, assuming now that a move amount of the F/R-CRG 12 per 1 pulse of the carriage drive motor is equal to "$d_m$" the motor drive circuit applies such a pulse number "$P=d_{home}/d_m$" to the carriage drive motor until the F/R-CRG 12 is reached to the scanning start position.

In contrast to the above-described color image reading operation, for instance, in the case that a black/white image is read using the element array 15W, as indicated in FIG. 7(b), such a position which is moved from the home position of the F/R-CRG 12 not by the distance "$d_{home}$", but a distance "$d_3=d_{home}+d_s$" is set as the scanning start position. It should be noted that the distance "$d_s$" corresponds to a distance (for example, 0.8 to 1.0 mm) which is equivalent to a gap of a position to be read on an original, which corresponds to an interval between the element array 15R and the element array 15W. As a result, a registration position at this time is made coincident with, for example, a reading position corresponding to the element array 15W.

In order to variably change such a scanning start position, the motor drive circuit executes, for example, such a pulse control operation as indicated in FIG. 8(b) in the case that the black/white image is read out. In other words, when the black/white image is read out, the motor drive circuit applies a pulse number "$P=(d_{home}+d_s)/d_m$" to the carriage drive motor by considering a variable amount of the scanning start position of the F/R-CRG12. In other words, the motor drive circuit switches the pulse numbers "P" applied to the carriage motor when the color image is read out, and the black/white image is read out. The pulse numbers "P" to be switched may be previously set to a table and the like, or may be calculated every time a predetermined calculation is carried out. Since the pulse numbers "P" are switched in such a manner, the scanning start position of the F/R-CRG 12 may be variably changed.

It should be noted that as previously explained, the motor drive circuit may not variably change the scanning start position by applying the pulse number to which the gap equivalent value is added, but may use another variable method. That is, for instance, as indicated in FIG. 8(c), when the black/white image is read out, while a $(d_s/d_m)$ pulse is previously applied to the carriage drive motor, thereafter, the pulse number "$P=d_{home}/d_m$" may be applied to the carriage drive motor in a similar manner to the reading operation of the color image. In this case, even when the black/white image is read, a control operation similar to the control operation for the color image may be carried out to accelerate the F/R-CRG12.

As a consequence, in accordance with the image reading apparatus of this fourth embodiment, since the scanning start position with respect to the original mounted on the platen glass 11 can be variably changed by the distance equivalent to the gap to be corrected, for instance, the registration position can be made coincident with the reading position corresponding to the element array 15R of the three-line structure when the color image is read out, whereas the registration position is made coincident with the reading position corresponding to the element array 15W exclusively used to read the black/white image when the black/white image is read out. In other words, even when a certain interval is present between the element array 15R and the element array 15W, since the scanning start position with respect to the original may be mechanically varied, the gap of the position to be read on the original, which corresponds to this interval, can be corrected.

As a consequence, similar to the above-described first to third embodiments, in the image reading apparatus of this fourth embodiment, it is possible to avoid deteriorations of reading image qualities, which are caused by the gap of the position to be read on the original.

[Explanation of Fifth Embodiment]

Figure 9:
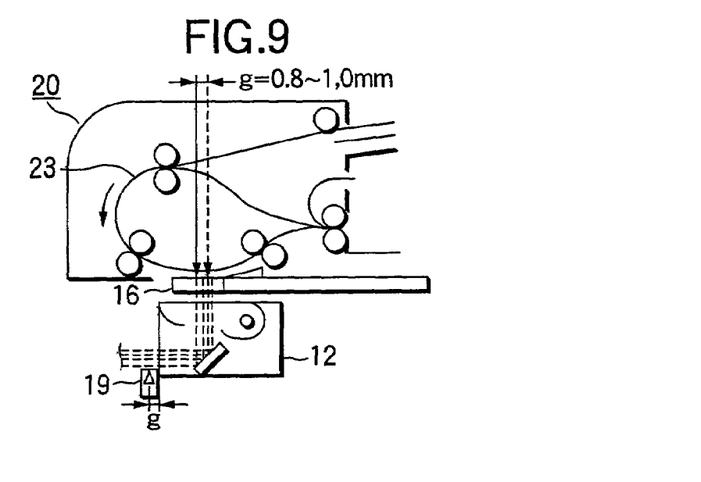
FIG. 9 is an explanatory diagram for explaining a concrete example of a pulse control conceptional idea of a fifth embodiment of a gap correction realized by a position variable process operation performed by the image reading apparatus according to the present invention.

Next, a description will now be made of a gap correction realized by a position variable process operation, according to a fifth embodiment. FIG. 9 is an explanatory diagram for indicating a conceptional idea of the gap correction according to the fifth embodiment.

An image reading apparatus according to this fifth embodiment may be applied to such a case that an image reading operation is carried out in the CVT system. When the image reading operation corresponding to the CVT system is carried out, an original to be read is transported at a constant velocity by the original transporting device 23 of the CVT original feeding unit 20.

At this time, the F/R-CRG 12 of the scanner unit 10 remains stationary at a home position below the CVT-designed platen glass 16. This home position may be specified by a home position sensor 19 which is fixed so as to detect the position of the F/R-CRG 12.

However, since a certain interval is present between the element arrays 15R, 15G, 15B used to read the color image, and the element array 15W used to read the black/white image, such a positional shift of "g=0.8 to 1.0 mm" will occur on the F/R-CRG 12. That is, this positional shift is produced by a gap of a position to be read on an original between an optical axis corresponding to, for example, the element array 15G which is located at the center of the three-line structure, and another optical axis corresponding to the element array 15W.

As a consequence, in the image reading apparatus of this fifth embodiment, motor drive circuit for managing the carriage drive motor performs a pulse control operation so that the stationary position (home position) of the F/R-CRG 12 may be variably changed by a distance equivalent to such a gap to be corrected in response to which one of the element arrays 15R, 15G, 15B, 15W of the solid-state image sensing device array group 15 is used to perform an image reading operation, concretely speaking, in response to which the three line structure of the element arrays 15R, 15G, 15B or the element array 15W exclusively used to read black and white image is used to perform the image reading operation.

For example, in the case that a color image is read out using the element arrays 15R, 15G, 15B, the home position of the F/R-CRG 12 is specified based upon only the detection result of the home position sensor 19. At this time, the CVT original reading position may be made coincident with, for example, the reading position corresponding to the element array 15R.

In contrast to the above-described color image reading operation, for instance, for example, in the case that a black/white image is read using the element array 15W, such a pulse number for a distance (for instance, g=0.8 to 1.0 mm) equivalent to the gap to be corrected from the position specified based upon the detection result obtained by the home position sensor 19 is applied to the carriage drive motor, so that the home position of the F/R-CRG 12 is moved. As a consequence, at this time, the CVT original reading position is made coincident with, for example, the reading position corresponding to the element array 15W.

It should also be noted that the movement of the home position may be carried out not by such a pulse control operation by the motor drive circuit, but by arranging home position sensors corresponding to the respective positions.

As a consequence, in accordance with the image reading apparatus of this fifth embodiment, since the home position corresponding to the stationary position of the F/R-CRG 12 can be moved by the distance equivalent to the gap to be corrected, for example, the CVT original reading position can be made coincident with the reading position corresponding to the element array 15G of the three-line structure when the color image is read out, whereas the CVT original reading position is made coincident with the reading position corresponding to the element array 15W exclusively used to read the black/white image when the black/white image is read out. In other words, even when a certain interval is present between the element array 15G and the element array 15W, since the home position of the F/R-CRG 12 may be mechanically varied, the gap of the position to be read on the original, which corresponds to this interval, can be corrected.

As a consequence, similar to the above-described first to fourth embodiments, in the image reading apparatus of this fifth embodiment, it is possible to avoid deteriorations of reading image qualities, which are caused by the gap of the position to be read on the original.

[Explanation of Sixth Embodiment]

Next, a description will now be made of a gap correction realized by a position variable process operation, according to a sixth embodiment. FIG. 10 is an explanatory diagram for indicating a conceptional idea of the gap correction according to the sixth embodiment.

Similar to the above-described case of the fifth embodiment, the image reading apparatus of this sixth embodiment may also be applied to such a case that an image reading operation is carried out in the CVT system. A different point of this image reading apparatus from the fifth embodiment is given as follows: That is, while the home position of the F/R-CRG 12 is not moved (home position is one and is fixed), transport timing of an original by the original transporting device 23 is made different from each other so as to move a position to be read on this original.

Figure 10A:
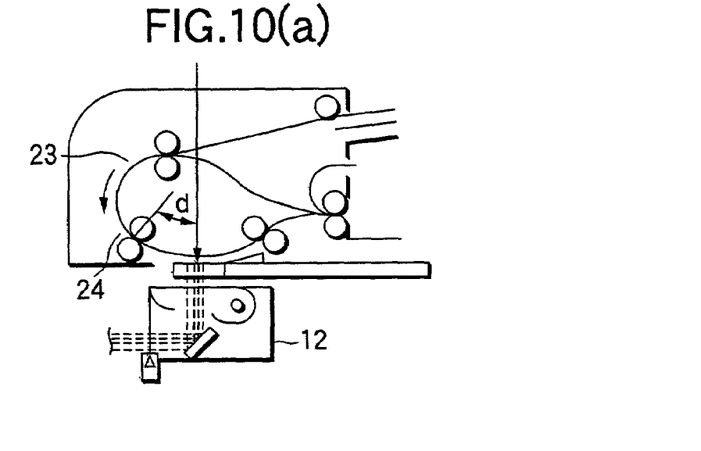
FIG. 10(a) is a diagram for indicating a condition when a color image is read.
Figure 10B:
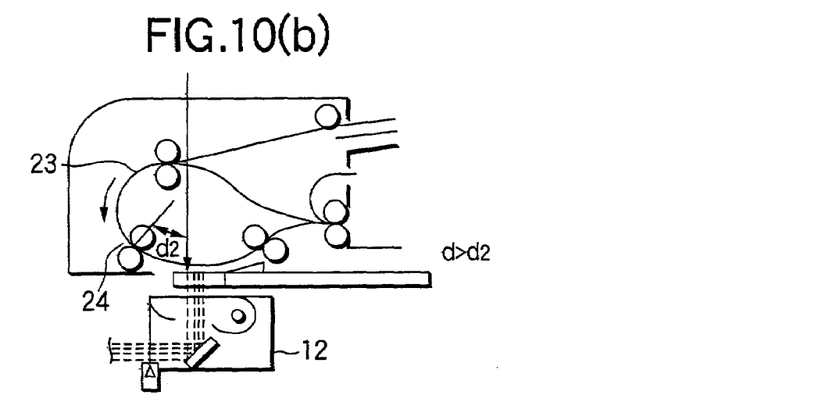
FIG. 10(b) is diagram for representing a condition when a black/white image is read.

For example, as shown in FIG. 10(a) and FIG. 10(b), when the F/R-CRG 12 remains stationary at one home position, a distance "$d_2$" is smaller than another distance "d" by a gap of a position to be read on an original (d>$d_2$). The distance "$d_2$" is defined between a registration roller 24 located just before the CVT original reading position provided with the original transporting device 23 and a reading position corresponding to the element array 15W used to read out ablack/white image. The distance "d" is defined between this registration roller 24 and such a reading position corresponding to, for example, the element array 15G located at the center position of the three-line structure of the element arrays 15R, 15G, 15B, which are used to read out a color image.

As a consequence, in the image reading apparatus of this embodiment, when the black/white image is read out, drive start timing of the registration roller 24 after a tip portion of the original abuts against the registration roller 24 is delayed by a time duration equivalent to "$d_2$-d", as compared with such a case that the color image is read out. In other words, the drive start timing of this registration roller 24 is delayed by such a time duration required for the original transporting device 23 to transport the original over a distance equivalent to a gap to be corrected. As a result, since the position to be read on the original when the color image is read out is moved, and also the position to be read on the original when the black/white image is read out is moved, it is possible to avoid the deteriorations of the reading image qualities, which are caused by the gap of the position to be read on the original similar to the above-described cases of the first to fifth embodiments.

It should also be noted that such a timing control operation for correcting the gap may be carried out by not differing the transport timing of the original, but by variably changing the driving timing or the reading start timing of the solid-state image sensing device array group 15. For instance, when the black/white image is read out, the reading start timing by the element array 15W is advanced, or led by such a time duration equivalent to "$d_2$-d", as compared with such a case that the color image is read out. As a result, completely similar to the above-explained operation, since the position to be read on the original when the color image is read out is moved, and also the position to be read on the original when the black/white is read out is moved, it is possible to avoid the deteriorations of the reading image qualities, which are caused by the gap of the position to be read on the original.

The variable changing operation of the driving timing or the reading start timing of the solid-state image sensing device array group 15 may be realized by controlling the timing signal which is applied from the drive circuit of the solid-state image sensing device group 15. In this alternative case, a reference point (starting point) may be set to, as explained above, the driving start point of the registration roller 24. Alternatively, this reference point may be set as a time instant when an original has passed through a sensor which is provided on the original transport path in the original transporting device 23.

Also, the gap correction realized by controlling the driving timing or the reading start timing of the solid-state image sensing device array group 15 may be applied not only to such an operation when the image is read out by way of the CVT system, but also to such an operation when the image is read out by way of the platen scan system.

As previously described above, in the above-described first to sixth embodiments, even in such a case that both the element arrays 15R, 15G, 15B for the color image and the element array 15W for the black/white image are arranged side by side on the solid-state image sensing device group 15, since the gap of the position to be read on the original, which is produced in correspondence with this side-by-side arrangement of the element arrays, can be corrected, the deterioration in the reading image qualities can be avoided. Moreover, since this gap correction is carried out by the position variable process operation, the deterioration of the reading image qualities occurred in the vicinity of the original edge portion can also be firmly solved without requiring the large storage capacity of memories.

In the first to sixth embodiments, the position variable processing operations have been carried out both when the color image is read out, and the black/white image is read out. Alternatively, a decision as to whether a reading subject corresponds to a color image, or a black/white image may be judged in accordance with, for example, a mode set by instructing an operation panel of the image reading apparatus. The position variable process operation is not limited to the gap corrections executed when the color image is read out, and also, the black/white image is read out. In other words, this position variable process operation may be applied to any case in order to correct gaps among the respective element arrays which are arranged side by side.

Also, in the first to sixth embodiments, the position of the optical axis when the color image is read has been made coincident with either the element array 15R or the element array 15G. Alternatively, this position of the optical axis may be made in correspondence with any of these element arrays 15R, 15G, and 15B. It should also be noted that as to the gaps caused by the intervals among these element arrays 15R, 15G, 15B, since the gap is narrower than the interval with respect to the element array for the black/white image, this gap may be processed by way of the line delay process operation with employment of the FIFO memory and the like similar to the conventional process operation.

Also, in the first to sixth embodiments, the present invention has been applied to such an image reading apparatus capable of being operated in both the platen scan system and the CVT system. Apparently, the present invention may be applied to even such an image reading apparatus capable of being operated only in one of these systems.

As previously described in detail, in accordance with the image reading apparatus of the present invention, even when the gap is produced at the position to be read on the original in correspondence with the intervals among a plurality of solid-state image sensing devices arranged side by side, this gap can be corrected by executing the position variable process operation. As a result, in particular, the deterioration of the reading image qualities occurred in the vicinity of the edge portion of the original can be firmly avoided without requiring the large storage capacity of the memories.

What is claimed is:

1. An image reading apparatus comprising:
   an image reading device having a plurality of solid-state image sensing device arrays arranged to be parallel to each other, the image reading device for optically reading an image on an original, each of the plurality of solid-state image sensing device arrays reading respective positions of the image on the original; and
   a registration adjusting device that adjusts the respective positions for reading the image on the original, the adjustment being made based on a gap defined by an interval between the solid-state image sensing device arrays,
   wherein the registration adjusting device includes:
      a first flat plate glass on which reflection light from the original is incident at a substantially right angle; and
      a second flat plate glass on which the reflection light is incident at a predetermined angle, which is not a right angle; and
   wherein the registration adjusting device makes the reflection light to transmit one of the first and second flat glasses selectively to change a light axis of the reflection light.

2. The image reading apparatus according to claim 1, wherein the plurality of solid-state image sensing device arrays are solid-state image sensing device arrays corresponding to a reading operation of a color image and a solid-state image sensing device array corresponding to a reading operation of a black and white image.

3. An image reading apparatus comprising:
   an image reading device having a plurality of solid-state image sensing device arrays arranged to be parallel to each other, the image reading device for optically reading an image on an original, each of the plurality of solid-state image sensing device arrays reading respective positions of the image on the original; and
   a registration adjusting device that adjusts the respective positions for reading the image on the original, the adjustment being made based on a gap defined by an interval between the solid-state image sensing device arrays,
   wherein the registration adjusting device includes:
      a first flat plate glass on which reflection light from the original is incident at a substantially right angle; and
      a second flat plate glass on which the reflection light is incident at a predetermined angle, which is not a right angle; and
   wherein the registration adjusting device moves one of the first and second flat plate glasses in a predetermined direction based on the solid-state image sensing device array to be used to read the original.

4. The image reading apparatus according to claim 3, wherein the plurality of solid-state image sensing device arrays are solid-state image sensing device arrays corresponding to a reading operation of a color image and a solid-state image sensing device array corresponding to a reading operation of a black and white image.

5. An image reading apparatus comprising:
   an image reading device having a plurality of solid-state image sensing device arrays arranged to be parallel to each other, the image reading device for optically reading an image on an original, each of the plurality of solid-state image sensing device arrays reading respective positions of the image on the original; and
   a registration adjusting device that adjusts the respective positions for reading the image on the original, the adjustment being made based on a gap defined by an interval between the solid-state image sensing device arrays,
   wherein the registration adjusting device moves the plurality of solid-state image sensing device arrays along an arranging direction of the solid-state image sensing device arrays to change a relative position between the solid-state image sensing device arrays and an optical axis of the reflection light from the original.

6. The image reading apparatus according to claim 5, wherein the plurality of solid-state image sensing device arrays are solid-state image sensing device arrays corresponding to a reading operation of a color image and a solid-state image sensing device array corresponding to a reading operation of a black and white image.

7. An image reading apparatus comprising:
   an image reading device having a plurality of solid-state image sensing device arrays arranged to be parallel to each other, the image reading device for optically reading an image on an original, each of the plurality of solid-state image sensing device arrays reading respective positions of the image on the original;
   a registration adjusting device that adjusts the respective positions for reading the image on the original, the adjustment being made based on a gap defined by an interval between the solid-state image sensing device arrays; and
   a lens for focusing reflection light from the original on the solid-state image sensing device arrays,
   wherein the registration adjusting device moves the lens along an arranging direction of the solid-state image sensing device arrays to change a relative position between the solid-state image sensing device arrays and an optical axis of the reflection light from the original.

8. The image reading apparatus according to claim 7, wherein the plurality of solid-state image sensing device arrays are solid-state image sensing device arrays corresponding to a reading operation of a color image and a solid-state image sensing device array corresponding to a reading operation of a black and white image.

9. An image reading apparatus comprising:
   an image reading device having a plurality of solid-state image sensing device arrays arranged to be parallel to each other, the image reading device for optically reading an image on an original, each of the plurality of solid-state image sensing device arrays reading respective positions of the image on the original;

a registration adjusting device that adjusts the respective positions for reading the image on the original, the adjustment being made based on a gap defined by an interval between the solid-state image sensing device arrays; and an optical scanning system for moving along an original table on which the original is set to scan a surface to be read of the original, wherein the registration adjusting device changes a scanning start position from which the optical scanning system starts to scan by a distance corresponding to the gap to be corrected in accordance with the solid-state image sensing device to be used to read the original.

10. The image reading apparatus according to claim 9, wherein the plurality of solid-state image sensing device arrays are solid-state image sensing device arrays corresponding to a reading operation of a color image and a solid-state image sensing device array corresponding to a reading operation of a black and white image.

11. An image reading apparatus comprising:

an image reading device having a plurality of solid-state image sensing device arrays arranged to be parallel to each other, the image reading device for optically reading an image on an original, each of the plurality of solid-state image sensing device arrays reading respective positions of the image on the original;

a registration adjusting device that adjusts the respective positions for reading the image on the original, the adjustment being made based on a gap defined by an interval between the solid-state image sensing device arrays;

an optical scanning system for scanning a surface to be read of the original; and an original transporting device for transporting the original in a constant velocity over a position corresponding to the optical scanning system under stationary condition, wherein the registration adjusting device moves a stationary position of the optical scanning system by a distance corresponding to the gap to be corrected in accordance with the solid-state image sensing device to be used to read the original.

12. The image reading apparatus according to claim 11, wherein the plurality of solid-state image sensing device arrays are solid-state image sensing device arrays corresponding to a reading operation of a color image and a solid-state image sensing device array corresponding to a reading operation of a black and white image.

13. An image reading apparatus comprising:

an image reading device having a plurality of solid-state image sensing device arrays arranged to be parallel to each other, the image reading device for optically reading an image on an original, each of the plurality of solid-state image sensing device arrays reading respective positions of the image on the original;

a registration adjusting device that adjusts the respective positions for reading the image on the original, the adjustment being made based on a gap defined by an interval between the solid-state image sensing device arrays;

an optical scanning system for scanning a surface to be read of the original; and an original transporting device for transporting the original in a constant velocity over a position corresponding to the optical scanning system under stationary condition, wherein the registration adjusting device change a transporting timing of the original by the image transporting device by a distance corresponding to the gap to be corrected in accordance with the solid-state image sensing device to be used to read the original.

14. The image reading apparatus according to claim 13, wherein the plurality of solid-state image sensing device arrays are solid-state image sensing device arrays corresponding to a reading operation of a color image and a solid-state image sensing device array corresponding to a reading operation of a black and white image.

15. An image reading apparatus comprising:

an image reading device having a plurality of solid-state image sensing device arrays arranged to be parallel to each other, the image reading device for optically reading an image on an original, each of the plurality of solid-state image sensing device arrays reading respective positions of the image on the original;

a registration adjusting device that adjusts the respective positions for reading the image on the original, the adjustment being made based on a gap defined by an interval between the solid-state image sensing device arrays; and an optical scanning system for scanning a surface to be read of the original, wherein in accordance with the solid-state image sensing device to be used to read the original, the registration adjusting device changes one of a driving timing and a reading start timing of the solid-state image sensing device by a time duration, which the optical scanning device requires to scan the original over a distance corresponding to the gap to be corrected.

16. The image reading apparatus according to claim 15, wherein the plurality of solid-state image sensing device arrays are solid-state image sensing device arrays corresponding to a reading operation of a color image and a solid-state image sensing device array corresponding to a reading operation of a black and white image.

17. An image reading apparatus comprising:

an image reading device having a plurality of solid-state image sensing device arrays arranged to be parallel to each other, the image reading device for optically reading an image on an original, each of the plurality of solid-state image sensing device arrays reading respective positions of the image on the original;

a registration adjusting device that adjusts the respective positions for reading the image on the original, the adjustment being made based on a gap defined by an interval between the solid-state image sensing device arrays; and an original transporting device for transporting the original in a constant velocity, wherein in accordance with the solid-state image sensing device to be used to read the original, the registration adjusting device changes one of a driving timing and a reading start timing of the solid-state image sensing device by a time duration, which the original transporting device requires to transport the original over a distance corresponding to the gap to be corrected.

18. The image reading apparatus according to claim 17, wherein the plurality of solid-state image sensing device arrays are solid-state image sensing device arrays corresponding to a reading operation of a color image and a solid-state image sensing device array corresponding to a reading operation of a black and white image.

* * * * *